United States Patent [19]

Glanz et al.

[11] Patent Number: 4,622,718
[45] Date of Patent: Nov. 18, 1986

[54] METHODS OF SEVERING SAUSAGE CASINGS

[75] Inventors: Ronald P. Glanz, Danville; Gerald E. Miner, Jr., St. Joseph, both of Ill.

[73] Assignee: Teepak, Inc., Oak Brook, Ill.

[21] Appl. No.: 630,919

[22] Filed: Jul. 16, 1984

[51] Int. Cl.[4] ..................... B26F 3/00; A22C 21/00
[52] U.S. Cl. ........................................ 17/49; 17/42; 83/53; 83/177
[58] Field of Search ............... 83/53, 177, 591–593, 83/596, 54, 56, 880, 885; 266/56; 17/41, 49, 42

[56] References Cited

U.S. PATENT DOCUMENTS

| | | | |
|---|---|---|---|
| 2,963,821 | 12/1960 | Baker | 83/177 |
| 3,069,298 | 12/1962 | Stellmacher | 266/56 X |
| 3,222,192 | 12/1965 | Arnold et al. | 99/176 |
| 3,570,050 | 3/1971 | Draper et al. | 17/46 |
| 3,594,856 | 7/1971 | Michl | 17/42 |
| 3,657,769 | 4/1972 | Martinek | 17/42 |
| 3,669,791 | 6/1972 | Bridgeford | 156/244 |
| 3,722,032 | 3/1973 | Draper et al. | 17/1 G |
| 3,878,978 | 4/1975 | Martinek | 225/1 |
| 3,936,909 | 2/1976 | Carter | 17/42 |
| 3,988,804 | 11/1976 | Regner et al. | 17/45 |
| 4,307,489 | 12/1981 | Niedecker | 17/49 |
| 4,345,745 | 8/1982 | Steele | 266/56 |

OTHER PUBLICATIONS

Olson, John H., Cutting by Waterjet; Flow Industries, Inc., pp. 1–25, 1980.
Hull, P., Flow Systems, Inc., Product Specification for Articulated-Boom Waterouter Model 401, pp. 1–13, 1980.

Primary Examiner—James M. Meister
Assistant Examiner—John L. Knoble
Attorney, Agent, or Firm—Howard M. Ellis; Michael L. Dunn

[57] ABSTRACT

Flexible, tubular and inflatable sausage casings are cleanly severed during continuous shirring operations without formation of troublesome loose tab-ends by impinging thin, high pressure, high velocity water jet(s) against casing sidewall. Severing may be performed over a shirring mandrel without damage to the same.

3 Claims, 2 Drawing Figures

METHODS OF SEVERING SAUSAGE CASINGS

BACKGROUND OF THE INVENTION

The present invention relates to shirred or sheeted strands of tubular food casings and methods of manufacture. More particularly, the present invention relates to sausage or meat casings which are free of residual casing material or loose tab-ends. The improved methods eliminate the need for end-dressing step(s) during manufacturing and avoid filling equipment jamming during stuffing.

Food casings, such as those made of regenerated cellulose and collagen have been widely used for a number of years in processing frankfurters, sausages, bologna, etc. For instance, the basic process for manufacturing small diameter casings of regenerated cellulose is known as the "viscose process" and is described in such patents as U.S. Pat. Nos. 2,999,756 and 3,835,113. Essentially, viscose is extruded onto a fibrous web and regenerated in a coagulating bath to form a tubular casing. The regenerated gel casing is washed, impregnated with a plasticizer, dried and wound into flat reelstock. For convenience in handling and in filling such food casings, they are shirred on high-speed shirring machines, like those described in U.S. Pat. Nos. 2,010,626; 2,583,654; 2,722,714; 2,722,715; 2,723,201 and 3,451,827. In the shirring process, lengths of from 40 to 200 feet of casing are compacted into pleated strands of a few inches, as for example, 4 to 30 inches at a rate of from 10 to 15 ft./sec.

As part of the shirring process, the strands must be severed, for example, from continuous reelstock from which they originated. Most of the methods for severing shirred sausage casings routinely result in the formation of a loose or unshirred tab-like piece of residual casing material which remains at the filling horn insertion (tab) end of the strand. In the case of manual filling of sausage casings the presence of such a loose tab at the horn insertion end can be rectified by hand and does not present a major problem. However, in high-speed, highly automated filling operations the presence of a loose tab-end on the horn insertion end of a strand, can have more major consequences. For example, a loose tab-end can interfere with the proper fitting of a strand onto the stuffing horn of a highspeed filling machine which can become entangled as the horn is inserted automatically into the strand. Under such circumstances, the strand can deshirr from both the filling and horn insertion end causing the process to jam, discharging meat into the filling station work area which means lost meat emulsion, as well as lost production output due to downtime.

Previous efforts to alleviate the problems associated with loose tab-ends have been mainly two-fold. The first approach involves the use of conventional severing means, such as passing a cutting blade or heated wire through the casing. A tab-like end is usually formed on the strand by such cutting methods, which in turn requires further processing step(s) for removal, etc. One representative processing step is described in copending application Ser. No. 559,165, filed Dec. 7, 1983, which relies on an end-dressing made on the strand by ironing down the loose tab-end.

Although use of end-dressings, like that previously described can be effective in alleviating the problems associated with residual casing material remaining on shirred strands, improved methods of severing tubular food casings have been sought which would eliminate the formation of loose tab-ends, all together. This, in effect, would be desirable because it would also avoid the need for end-dressings.

One novel method of severing food casings without formation of loose tab-ends is described in U.S. Pat. No. 3,878,978 and involves impinging liquified carbon dioxide against a food casing until the sidewall becomes brittle from the cold. Force exerted against the brittle film severs the casing without a loose tab-end being formed. Notwithstanding, fracturing the brittle, frozen casing may, in some instances, cause small particles of frozen film to be discharged into the central opening of the casing where they may become entrained in the food product during stuffing. Consequently, the potential hazard associated with this method, in some instances, has detracted from its total acceptability. Accordingly, there is still a need for improved methods of making strands of flexible tubular food casings which are cleanly cut from continuous reelstock wherein the cutting step is performed without developing loose, residual casing material or tab-ends to jam and foul high-speed automated filling equipment.

The present invention provides for a dependable and safe method for severing food casings cleanly and substantially instantaneously without forming loose tab-ends, or requiring special end-dressings. Severing is carried out by means of contacting a thin, high pressure stream of aqueous liquid against the sidewall of the casing. The width and pressure of the stream making contact with the casing are sufficient to sever the casing cleanly and evenly. The severing process does not generate potentially hazardous particles of casing material in the cutting zone which can discharge into the strand. Because the process does not rely on the application of heat in forming an enddressing, casing pleats are not fused, and will completely unfold and deshirr in a normal manner during filling operations. Casing loss or waste is thereby eliminated or minimized and production costs are lowered.

Accordingly, it is a principal object of the present invention to provide the means needed for manufacturing improved food casings without loose tab-ends commonly associated with prior shirring methods.

It is a further object of the present invention to provide means for making sausage casings which are more dependable for use with automated filling equipment.

A still further object of the present invention is the elimination of end-dressing steps in making strands of shirred food casings.

These and other objects, features and advantages of the present invention will become more apparent from the following more detailed descriptions.

SUMMARY OF THE INVENTION

The present invention provides for improved methods for making sausage, meat and other types of food casings having cleanly severed ends on the casing's tab (horn insertion) end thereby eliminating the potential for jamming during high-speed, automated fillings. Generally, the invention relates to methods of severing flexible, inflatable food casings having a tubular sidewall and a central opening comprising the step of impinging a thin, high pressure stream of aqueous liquid against the casing sidewall at pressures sufficient to sever the casing cleanly and substantially instantaneously upon contact.

In a preferred aspect of the invention, the severing is conducted during the shirring of flat reelstock wherein a needle-thin, highly pressurized stream of aqueous liquid, such as water, is directed against the trailing edge of a shirred strand of casing separating the strand from the adjacent unshirred reelstock. Thus, one aspect of the invention relates to severing the casing while at least a portion of said casing is mounted on a shirring mandrel. The high pressure cutting stream may be directed either at an area of the casing having a mandrel situated therein, or at some other point in the shirring process, e.g. . . before the casing has reached the mandrel or at point where there is a break or hiatus in the mandrel, etc. Regardless which embodiment is practiced, the present invention contemplates water-cutting means for severing food casing cleanly and instantly without striking or damaging the shirring mandrel.

BRIEF DESCRIPTION OF THE DRAWINGS

For a further understanding of the invention, as well as the characterizing features, reference should now be made to the following detailed description thereof taken in conjunction with the accompanying drawings wherein.

DESCRIPTION OF PREFERRED EMBODIMENTS

The invention relates to a method of severing tubular shaped food casings usually having a rounded sidewall and a central opening. The method comprises impinging a thin, high pressure stream of aqueous liquid, usually comprised of water against the casing sidewall at sufficient pressure and velocity to cleanly and instantaneously sever a length of casing from a supply source. The process is not dependent on temperature extremes produced, for instance, by liquified gases, heated wires and the like or for that matter, mechanical devices like cutting blades, but instead, relies on a needle-thin jet of aqueous liquid discharged at very high velocity and pressure to cleanly sever the casing without tearing the casing material or generating potentially hazardous particles.

Severing according to the present invention is carried out with a needle-thin stream of high pressure aqueous liquid discharged through, for example, a nozzle equipped with a sapphire orafice. The stream of the cutting jet will operate effectively at pressures below about 60,000 psi, and more particulary, at pressures between about 20,000 and 55,000 psi and even higher. The stream will have a width generally in the range of about 0.003 and about 0.007 inches. Such ultra high pressure equipment is commercially available, one source being from Flow Systems, Inc., of Kent, Wash.

Generally, the method of the present invention is contemplated for use at any stage of the casing manufacturing process after being fabricated, dried and formed into flat reelstock. However, most frequently, the severing process will be used in conjunction with the shirring step, and in particular with continuous shirring methods while at least a portion of the casing is mounted on a shirring mandrel.

In general, the severing methods disclosed herein are adaptable to most edible and non-edible type of casings. Typically, such casings are formed from regenerated cellulose or collagen of the kind used in preparation of sausages, including frankfurters, bolognas, etc. The concepts embodied herein are also applicable to most other types of casing material, such as tubular films of amylose, starch, alginates, cellulose derivatives, gelatin, casein and the like. Any of the commonly used thicknesses can be severed according to the methods disclosed herein. That is to say, casings with wall thicknesses ranging from about 0.0005 to about 0.05 inches.

Figure 1:
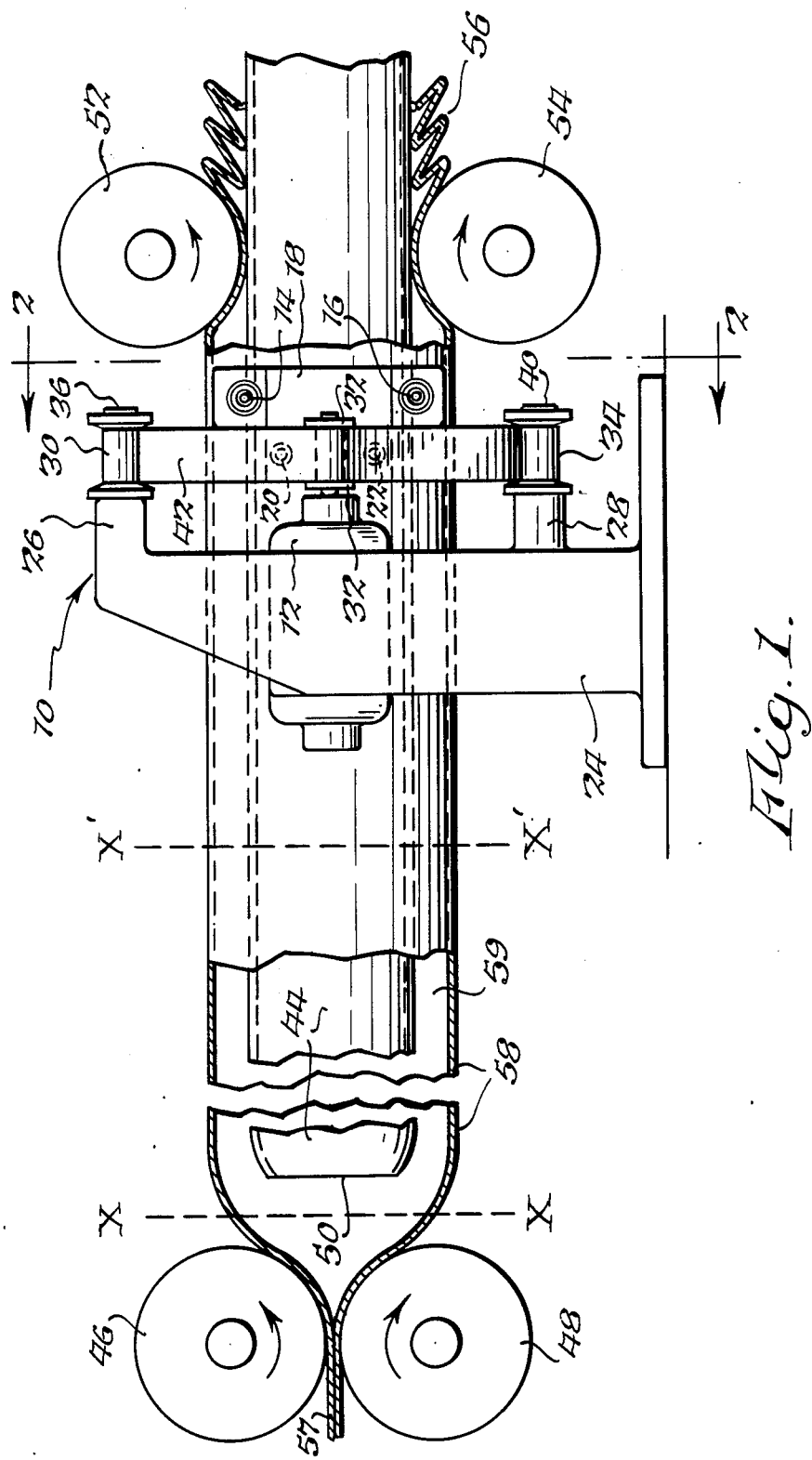
FIG. 1 is a side sectional view of a shirring apparatus, with the severing device.

As previously indicated, the severing methods contemplated herein are most frequently employed during shirring processes. FIG. 1 provides a partial view of a shirring machine equipped with a representative embodiment of a high pressure severing device 10 useful in practicing the methods disclosed and claimed herein. Flat tubular reelstock 57 is drawn over hollow shirring mandrel 44 by means of driven nip rolls 46 and 48 where the casing 58 is advanced to a shirring head represented by shirring wheels 52 and 54 to form a pleated strand 56. In the shirring process, casing between the shirring wheels 52 and 54 and nip rolls 46 and 48 is inflated with air discharged via nozzle 50 of the mandrel. Casing lubricant may also be discharged from the mandrel. The step of inflating the casing produces an expansion thereof and formation of an air space 59 between the casing sidewall 58 and the mandrel 44.

Figure 2:
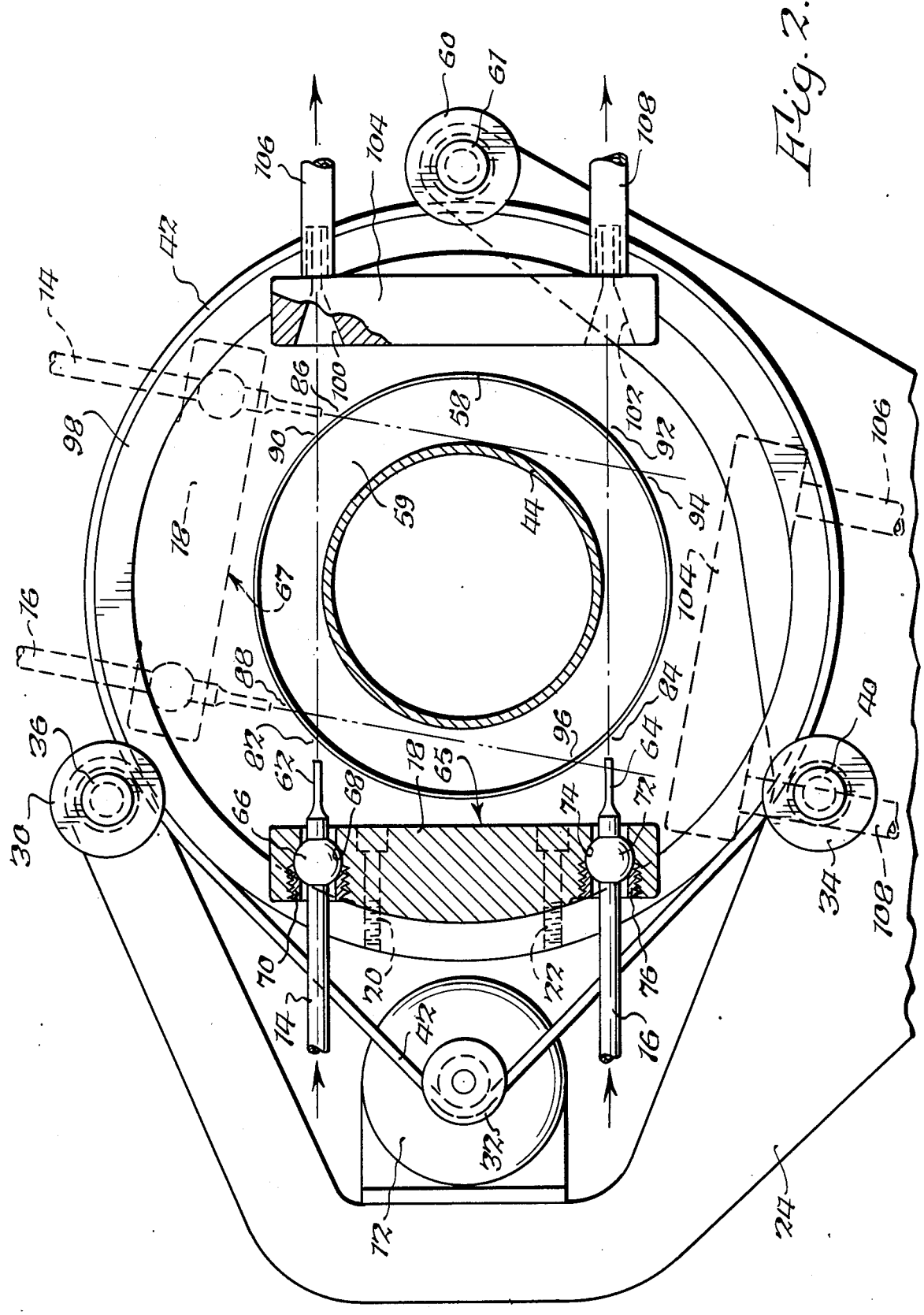
FIG. 2 is a cross sectional view taken along line 2—2 of FIG. 1.

The high pressure severing device 10 positioned adjacent to or in front of the shirring wheels (FIG. 1) is comprised of a support arm 24, dual high pressure water lines 14 and 16 affixed to high pressure nozzles 62 and 64 (FIG.2). The nozzles are supported by mount 18 affixed to a movable carrier 98 (FIG. 2) by means of threaded connecting pins 20 and 22. The positioning of the nozzles and fine adjustments in their direction of flow is made possible by ball and socket assemblies 66, 68 and 72, 74. Each nozzle is locked into position by threaded lugs 70 and 76 after appropriate adjustment.

It is a further object of the invention that nozzles 62 and 64 be mounted for movement such that the high pressure stream travels in a plane which is transverse to the longitudinal axis of the casing severing the casing without striking the mandrel. This is made possible by air space 59 which permits the jet to penetrate the casing sidewall without simultaneously contacting the mandrel per se.

The high pressure jets are received by first and second catchers 100 and 102 (FIG. 2) where the liquid is disposed of via lines 106 and 108. The receiving cups or catchers 100 and 102 are also affixed to carrier 98 by means of a mount 104.

In order to sever the entire casing wall without striking the mandrel, the high pressure streams are moved with coaxial rotation of carrier 98. Carrier 98 is mounted on multiple pulleys 30, 34 and 60 which are rotatably mounted to arms 26 and 28 (FIG. 1) of the device by axles 36, 40 and 61. The high pressure cutting device is rotated about the casing by actuating motor drive 12 which is equipped with a pulley 32 and drive belt 42 surrounding the entire carrier 98.

The severing device is powered by any ultra-high pressure pump of conventional design (not shown). The pump is preferably of the intensifier type which for purposes of this invention includes hydraulically driven reciprocating plunger pumps in which hydraulic oil is applied to a larger piston causing it to reciprocate. This larger piston in turn drives plungers which pump the cutting liquid. Such equipment is also available from Flow Systems, Inc., under such trademarks as Waternife. Upon actuation of the pump, a needle-thin stream of aqueous liquid, preferably water is discharged from nozzles 62 and 64. The initial points of entry into the casing sidewall by the streams are at 82 and 84 respectively. The exit paths are at 90 and 92 and are caught by receivers 100 and 102 for disposal. Simultaneously with actuation of the pressure pump, motor 12 is also actuated whereupon carrier 98 is rapidly pivoted at least 90° and preferably somewhat more than 90°, so that mount 18 and the cutting nozzles starting at first position 65 are instantaneously rotated to second position 67. It will be observed (FIG. 2), as the carrier 98 is pivoted to second position 67 the high pressure stream substantially instantaneously severs entirely around the circumference of the casing sidewall without making contact with mandrel 44. Accordingly, there may be a slight overlap of the slit in the casing as shown in FIG. 2, since the final points of entry of the high pressure stream are at 86 and 88 and the final exit points are at 94 and 96.

The distance of separation and the path of flow of nozzles 62 and 64 may be adjusted according to the dimensional requirements of individual casings so the path of flow remains inside of space 59 between the casing sidewall 58 and mandrel 44 thereby avoiding contact and possible damage to the mandrel. Similarly, as new casing advances on the mandrel, and shirred subsequent severing thereof may be carried out by actuating the high pressure pump and motor substantially simultaneously whereupon cutting nozzles are pivoted or reciprocated from the second position 67 back to first position 65, so on and so forth.

It is to be understood that the present invention is not restricted to multiple high pressure severing nozzles, but also includes embodiments which utilize a single nozzle. That is, the forgoing embodiment relates to severing food casings with a shirring mandrel 44 extending longitudinally well into the central opening of a casing. The severing device 10 illustrated with high pressure jets is positioned in front of the shirring wheels. Under such circumstances, severing is carried out by circumferential movement of multiple nozzles for more rapid cutting and to avoid damaging the mandrel. However, the high pressure severing device 10 may also be positioned in a location in front of the shirring mandrel, as for example, point X (FIG. 1). Accordingly, in those instances where contact with the mandrel is not a problem, a single cutting jet may be employed. In the case of a single jet a lateral or sweeping, pivot-like movement may be used where the stream travels in a plane which is essentially transverse to the longitudinal axis of the casing. Correspondingly, in continuous shirring machines, mandrels may be extended to point $X^1$ (FIG. 1) in which case the severing device may be positioned anteriorly thereto. Hereto, a lateral sweeping-like motion is all that may be required.

The present invention is also contemplated for use in conjunction with movable or floating type mandrels where a gap in the mandrel is created during the severing step. For example, a section of the mandrel may have magnetic means whereupon actuation is advanced to create a gap. That is, during the severing step a section of the mandrel which is magnetized may be opened to leave a gap for the path of the cutting jet to traverse.

The thin-high pressure jet of cutting liquid is comprised of an aqueous solution. In most instances, all that is necessary is water which has been distilled. The solution may, however, also contain a small amount of a polymer type binder, e.g. 1%, to maintain the water droplets in the form of a needle-thin stream as it exits the nozzle. It has been found that positioning the work piece in close proximity to the nozzle outlet, i.e. about 0.25 to 0.5 inches, most favorable cutting is achieved, thereby mitigating the need for special additives.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

What is claimed is:

1. A method of severing a tubular food casing during a shirred process, said method comprising the steps of mounting at least a portion of the casing on a shirring mandrel where said casing is inflated, and impinging a plurality of high pressure streams of aqueous liquid against said casing in planes which are transverse to the longitudinal axis of the casing while moving the streams laterally or rotationally about the axis of the casing, said streams simultaneously severing said casing at multiple locations without striking the mandrel.

2. The method of claim 1, including the step of rotating the streams reciprocally about the axis of the casing.

3. A method of severing a tubular food casing during a shirring process, said method comprising the steps of mounting at least a portion of the casing on a shirring mandrel where said casing is inflated, and impinging a high pressure stream of aqueous liquid against said casing in a plane which is transverse to the longitudinal axis of the casing while rotating the stream about the axis of the casing, said stream severing the casing without striking the mandrel.

* * * * *